United States Patent [19]
John

[11] Patent Number: 4,822,953
[45] Date of Patent: Apr. 18, 1989

[54] FIRE-PROTECTED ELECTRICAL CABLE CONNECTION

[75] Inventor: Gunther John, Hamburg, Fed. Rep. of Germany

[73] Assignee: Minnesota Mining and Manufacturing Company, St. Paul, Minn.

[21] Appl. No.: 102,307

[22] Filed: Sep. 25, 1987

Related U.S. Application Data

[63] Continuation of Ser. No. 902,941, Sep. 2, 1986, abandoned.

[30] Foreign Application Priority Data

Sep. 19, 1985 [DE] Fed. Rep. of Germany ....... 3533375

[51] Int. Cl.⁴ ............................................. H02G 15/08
[52] U.S. Cl. ................................. 174/88 R; 174/84 R
[58] Field of Search ................ 174/84 R, 88 R, 121 A

[56] References Cited
U.S. PATENT DOCUMENTS

| | | | |
|---|---|---|---|
| 1,834,376 | 12/1931 | Boving | 174/121 A |
| 1,895,898 | 1/1933 | Robinson | 174/121 A |
| 2,445,624 | 7/1948 | McDermott et al. | 174/84 R |
| 2,504,764 | 4/1950 | Vollrath | 174/121 A |
| 2,967,795 | 1/1961 | Bollmeier et al. | 174/84 R |
| 3,187,088 | 6/1965 | Warner | 174/88 R |
| 3,502,790 | 3/1970 | Cain et al. | 174/77 R |
| 3,828,119 | 8/1974 | Warburton et al. | 174/121 A |
| 3,862,353 | 1/1975 | Morton | 174/121 A X |
| 4,018,962 | 4/1977 | Pedlow | 174/121 A X |
| 4,589,939 | 5/1986 | Mohebban et al. | 174/88 R X |

FOREIGN PATENT DOCUMENTS

| | | | |
|---|---|---|---|
| 1494922 | 6/1969 | Fed. Rep. of Germany . | |
| 1569123 | 7/1969 | Fed. Rep. of Germany . | |
| 9395 | 4/1978 | Japan | 174/121 A |

*Primary Examiner*—Morris H. Nimmo
*Attorney, Agent, or Firm*—Donald M. Sell; Walter N. Kirn; Adonis A. Neblett

[57] ABSTRACT

An electrical cable connection comprising a plurality of core connections, each having an electrically insulating and sealing core enclosure which comprises a fire-resistant inorganic fiber material layer, and a shrunk sleeve thereover, together with a cable sealing enclosure which surrounds the core enclosure and has sufficient length to seal the cable sheath.

8 Claims, 1 Drawing Sheet

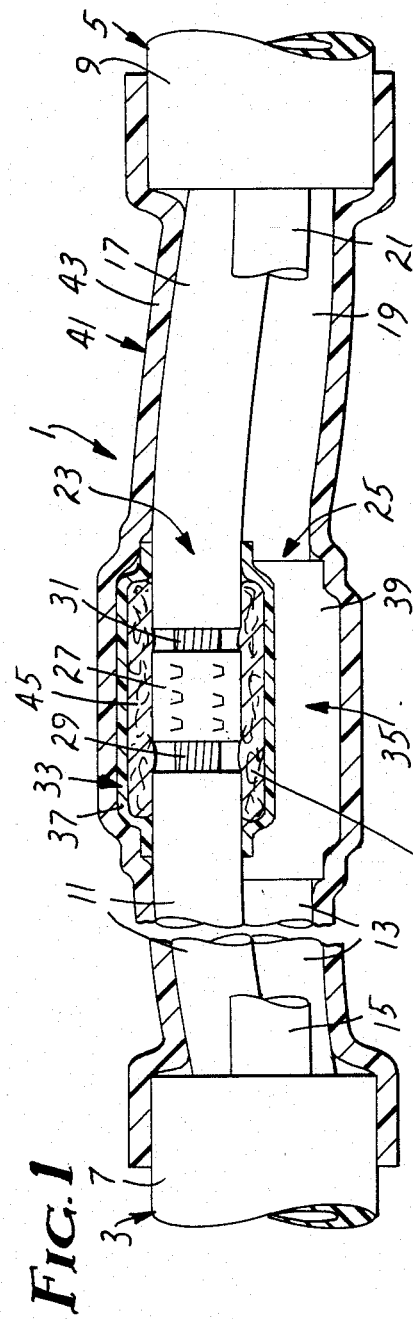
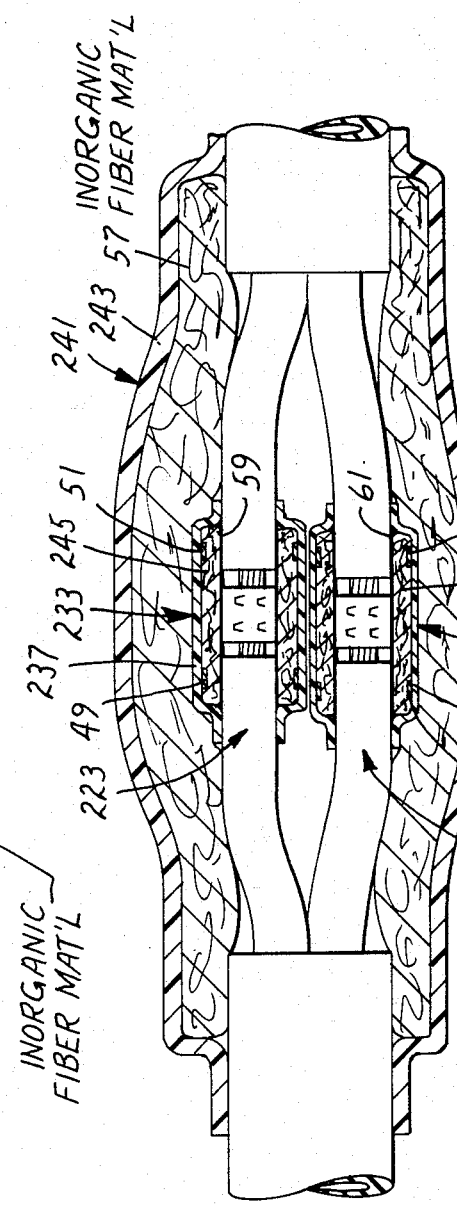
Fig. 1
Fig. 2

FIRE-PROTECTED ELECTRICAL CABLE CONNECTION

This is a continuation of application Ser. No. 902,941, filed Sept. 2, 1986, now abandoned.

TECHNICAL FIELD

The invention relates to an electric cable connection using a fire resistant inorganic fibrous layer therein, together with a heat shrinkable sleeve.

BACKGROUND ART

According to the prior art, cable connections of the general type noted above are extensively used. They offer the advantage that they can be easily manufactured at the site of application without the use of a casting mass (cable shaping material). However, such cable connections have hitherto not been applicable in cases where an increased resistance against fire is required. Under the influence of a fire, the cable sheath, which normally consists of plastic, and the shrunk sleeves, also consisting of plastic, of the core enclosures are rapidly melted away and destroyed and, as a consequence thereof, short-circuiting can occur between the core connections, and the cable function comes to an end.

Because of this low fire resistivity of the aforedescribed cable connections, it has been preferred to completely avoid the use of cable connections and instead turn to special cables having fire-resistant cable sheaths. The thus-caused extra consumption of expensive special cable was tolerated.

Plastic materials of increased fire resistivity are known, for example, highly halogenated plastics, or plastic masses which contain fire-inhibiting additives (German Offenlegungsschriften Nos. 15 69 123, 14 94 922). However, the fire resistivity of such plastic materials is not very great. If such plastic masses decompose under the influence of a fire, inconvenient, corrosive or toxic gases and vapors are set free. Shrunk hoses or sleeves cannot be manufactured from such materials and, accordingly, the use of such materials is restricted to other constructional types of cable connections It is the object of the invention to provide a cable connection of the kind indicated, in which it is ensured, by means which do not adversely affect the possibility of a simple manufacture, that under the influence of a fire, there is still a considerable time of operation.

DISCLOSURE OF THE INVENTION

In the cable connection according to the invention, the essentially shape-retaining layers of the fire-resistant inorganic fiber material are essentially retained under the influence of a fire, and thereby, inadvertent contacts, particularly short-circuits between the cores, are prevented even when the plastic constituents of the cable connection have already been melted away or destroyed. Since the layers of fire-resistant fiber material are provided at the core connections, they do not materially inhibit the dissipation of the heat which is generated in the core connection during operation. The tightness of the core connection, which is required in normal operation, is ensured by the shrunk hose or sleeve in the same manner as in similar cable connections without fire protection. The cable connection according to the invention can be prepared without difficulty at the site of operation, because the sealing is effected in the usual manner with shrunk hoses or sleeves No particular care is necessary when applying the layers of fiber material. Thus, the cable connection according to the invention can be prepared with the desired success even by less skilled operators.

DETAILED DESCRIPTION

In cable connections with are made without the use of a casting mass (cable shaping mass), the cable enclosure is usually made with a shrunk hose or sleeve which provides the sealing function between the cable sheaths. In cable connections of that type and according to the invention, a further increase of the fire resistivity can be obtained, in further developing the invention, in that a layer of inorganic fiber material is provided beneath the shrunk sleeve of the cable enclosure, the layer being resistant against fire and of substantially stable shape. Then, under the influence of a fire, the aforedescribed protective effects will result first at the cable enclosure, and only after a long influencing time, the destroying action of the fire can proceed to the area of the core connections, and then the already described protective action of the layers of fiber material which are provided there will come into play. Moreover, the layer of fire-resistant inorganic fibers provided beneath the shrunk sleeve of the cable enclosure offers the advantage that the heat applied upon the shrinking of the shrunk sleeve cannot adversely affect the shrunk sleeves of the core connections, which have already been completely shrunk-on. On the other hand, the heat conductivity of many fiber materials is sufficient to permit the dissipation of the operational heat in the case of normally rated cable connections.

There are several possibilities for the preparation of a substantially shape-retaining layer of inorganic fiber material. A shape stability which is in general sufficient will result initially by the mutual interhooking of the fibers; then, however, a desirable certain deformability and resiliency will be retained.

Fire-resistant inorganic fiber material is known and is commercially available in the several modifications, e.g. as a mat, fleece, ape, etc., and most of these commercial types are suitable for the preparation of the aforedescribed fiber layers It is particularly convenient if the layer of fiber material is provided in the form of a wrapper. Such wrapper can be made very easily of fleece, foil, tape, yarn, or the like, and with a sufficient thickness will provide a sufficient stability of shape, particularly in the critical areas above metallic parts under the tension, e.g. A press connector and/or bared conductors.

Also, it is convenient to provide the fiber layer in the form of a modeled body. For its manufacture, the fiber material can be employed in a hardenable paste.

The desired degree of shape stability of the fiber layers can also be obtained or improved by providing fire-resistant holding means, e.g. clamps of metal, holding the layer of fiber material together.

For the fiber material, a plurality of fire resistant inorganic materials are suitable, particularly glass fibers or ceramic fibers, which are known for easy workability and are commercially available in various forms, for instance as mats, non-woven fleeces, and the like. Ceramic fibers have the advantage of a particularly high temperature resistivity. Especially suitable is a ceramic fiber material which is distributed under the trade name "Trition Kaowool" by the company Morgan GmbH, Ratingen near Dusseldorf. That material is consistent up to about 1400° C.

Inorganic fiber material often has the property that the fibers adhere to each other without a binding agent; this phenomenon can be understood as being due to a mutual interhooking of the fibers and/or molecular forces (van der Waals forces), or electrical forces. The above-mentioned fiber material "Trition Kaowool" exhibits this particular property. When using fiber materials of that kind, the fibers in the layer of the fiber material can be free of binding materials and yet adhere to each other. Apart from that, also an embodiment is, of course, possible wherein in the layer of the fiber material, the fibers are bound to each other by a fire-resistant inorganic binding agent. As a binding agent, sodium silicate is particularly suitable, which is inexpensive and will not evolve deleterious gases under the influence of a fire.

After the preparation of a fiber material layer of a core connection, it may be desirable to adjust the position of the fiber material layer on the core connection. To facilitate this, it can be advantageous to provide a lubricating material (which is as heat-resistant as possible), as for instance silicone grease, beneath the layer of fiber material.

DESCRIPTION OF THE DRAWINGS

FIG. 1 is a diagrammatic view, partially in section, of a cable connection in accordance with the invention.

FIG. 2 is an illustration, corresponding to FIG. 1, of another embodiment.

In FIG. 2, parts which appear correspondingly in FIG. 1 are designated with the same reference numerals as in FIG. 1, but with a "2" as the initial numeral. The figures are not drawn to scale.

FIG. 1 illustrates an electric cable connection 1 between two electrical medium voltage three-core cables 3 and 5. Each of the cables has a cable sheath 7 and 9, respectively, and three insulated cores 11, 13, 15, and 17, 19, 21, respectively.

The illustrated cable connection has a number of core connections corresponding to the number of cable cores, thus three core connections in this case. Of those, the core connection between the cores 15 and 21 has been omitted in FIG. 1 for better clarity. Of the two remaining core connections 23 and 25, the core connection 23 is illustrated partly in section, it being understood that the other core connections are designed correspondingly. The core connection 23 has a press connector 27 which forms an electrical contact between bared end portions 29, 31 of the interconnected cores. Each core connection has an electrically insulating and sealing core enclosure 33, 35, which in the illustrated embodiment comprises a shrunk hose or sleeve 37 and 39, respectively. The whole cable connection has a sealing cable enclosure 41 which extends from the one cable sheath 7 to the other cable sheath 9 and comprises also a shrunk hose or sleeve 43 in the illustrated embodiment.

In the core enclosures, each has an essentially shape-resistant layer 45 or inorganic fiber material, which is resistant against a fire, provided beneath the shrunk hose. In the illustrated embodiment, the fiber material layer 45 consists of a wrapper of a tape-like non-woven fleece of a ceramic fiber material which is distributed by the company Morgan GmbH, Ratingen near Dusseldorf, under the designation "Trition Kaowool". In that ceramic fiber material, the fibers adhere to each other without necessity of binding agents.

FIG. 2 illustrates an embodiment which to a far degree corresponds to the embodiment according to FIG. 1; insofar, reference is made to the above description of FIG. 1 to avoid repetitions. Also in FIG. 2, only two of three core connections are illustrated.

Also in the cable connection according to FIG. 2, each core connection 223, 225 has a core enclosure 233, 235, each comprising a shrunk hose 237, 239, respectively, and arranged therebelow, and essentially shape-stable layer 245, 47, respectively, of inorganic fiber material, the layer being resistant against fire. Those fiber material layers, however, are additionally held together by heat-resistant holding means in the form of steel clamps 49, 51, and 53, 55, respectively. Moreover, also the cable enclosure 241 includes below its shrunk hose 243 a layer 57 of inorganic fiber material, said layer being resistant against fire and essentially of stable shape. This results in an even higher safety against fire, and the shrinking of the shrunk hose 243 of the cable enclosure 237 can be done without an inadmissibly high heating of the already shrunk hoses 235, 237, 239 of the core enclosures 233, 235.

The embodiment according to FIG. 2 moreover contains in each of the core enclosures a heat-resistant lubricating material 59, 61, for instance silicone grease, in order to facilitate a shifting of the fiber material 245, 47, if necessary.

What is claimed is:

1. An electrical cable connection comprising a plurality of core connections each having an electrically insulating and sealing core enclosure comprising a fire-resistant inorganic fiber material layer on said core connections and a shrunk sleeve thereover, and a sealing cable enclosure surrounding said core enclosures extending from a first cable sheath to a second cable sheath, said layer of fire-resistant inorganic fiber material being capable of maintaining a substantially stable shape and being in the form of a molded body.

2. The cable connection of claim 1 further comprising a heat-resistant clamping means to hold said fiber material layer together.

3. The cable connection of claim 1 wherein said fiber material layer comprises glass fibers.

4. The cable connection of claim 1 wherein said fiber material layer comprises ceramic fibers.

5. The cable connection of claim 1 wherein said fiber material layer comprises fibers and a heat-resistant inorganic binding agent.

6. The cable connection of claim 5 wherein said binding agent comprises sodium silicate.

7. The cable connection of claim 1 wherein said sealing core enclosure further comprises a lubricating composition beneath said fiber material layer.

8. An electrical cable connection comprising a plurality of core connection each having an electrically insulating and sealing core enclosure comprising a first fire-resistant inorganic fiber material layer on said core connections and a shrunk sleeve thereover, and a sealing cable enclosure comprising a second fire-resistant inorganic fiber material layer and a shrunk sleeve thereover surrounding said core connections extending from a first cable sheath to a second cable sheath, said first layer of a fire-resistant fiber material being capable of maintaining a substantially stable shape and being in the form of a molded body.

* * * * *